(12) United States Patent
Moran

(10) Patent No.: US 6,615,374 B1
(45) Date of Patent: Sep. 2, 2003

(54) FIRST AND NEXT ERROR IDENTIFICATION FOR INTEGRATED CIRCUIT DEVICES

(75) Inventor: Douglas R. Moran, Beaverton, OR (US)

(73) Assignee: Intel Corporation, Santa Clara, CA (US); .

(*) Notice: Subject to any disclaimer, the term of this patent is extended or adjusted under 35 U.S.C. 154(b) by 0 days.

(21) Appl. No.: 09/385,601

(22) Filed: Aug. 30, 1999

(51) Int. Cl.[7] .......................... G06F 11/00; H04L 1/22
(52) U.S. Cl. ................................ 714/48; 714/57
(58) Field of Search .................... 714/48, 49, 57, 714/47, 43, 44, 39, 25, 30, 52, 42, 45

(56) References Cited

U.S. PATENT DOCUMENTS

| 3,831,148 A | * | 8/1974 | Greenwald et al. ...... 340/172.5 |
| 3,873,819 A | * | 3/1975 | Greenwald .................. 235/153 |
| 4,769,761 A | * | 9/1988 | Downes et al. ............. 364/514 |
| 5,099,485 A | * | 3/1992 | Bruckert et al. ........... 371/68.3 |
| 5,490,250 A | * | 2/1996 | Reschke et al. ....... 375/185.01 |
| 5,513,346 A | * | 4/1996 | Satagopan et al. ..... 395/185.01 |
| 6,070,253 A | * | 5/2000 | Tavallaei et al. .............. 714/31 |
| 6,269,460 B1 | * | 7/2001 | Snover ........................ 714/48 |

* cited by examiner

Primary Examiner—Nadeem Iqbal
(74) Attorney, Agent, or Firm—Blakely, Sokoloff, Taylor & Zafman LLP

(57) ABSTRACT

An integrated circuit device performs first and next error identification. An error condition associated with an integrated circuit device function is detected. Whether the detected error condition is a first detected error condition is determined, and, if so, the detected error condition is identified as the first detected error condition. Otherwise, the detected error condition is identified as a next detected error condition. A first detected error condition may be recorded in a first error status register, and a next detected error condition may be recorded in a next error status register.

16 Claims, 3 Drawing Sheets

FIRST AND NEXT ERROR IDENTIFICATION FOR INTEGRATED CIRCUIT DEVICES

BACKGROUND OF THE INVENTION

1. Field of the Invention

The present invention relates generally to the field of integrated circuit devices. More particularly, the present invention relates to the field of error detection for integrated circuit devices.

2. Description of Related Art

Integrated circuit devices such as microprocessors, memory controllers, input/output controllers, etc., typically encounter various device and data error conditions in performing their functions. Such devices record detected error conditions by setting a corresponding bit in an error status register within the device. The location of the bit within the error status register corresponds to the error condition detected. Exemplary error conditions include hardware failures, parity errors, single-bit and multiple-bit error correcting code (ECC) errors, communication protocol violations, etc. Error handling may be performed by reading the error status register to identify any detected error conditions and performing suitable techniques to contain an error condition, possibly recover from the error condition, and/or reset the device.

BRIEF SUMMARY OF THE INVENTION

An error condition associated with an integrated circuit device function is detected. Whether the detected error condition is a first detected error condition is determined, and, if so, the detected error condition is identified as the first detected error condition.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The following detailed description sets forth an embodiment or embodiments in accordance with the present invention for first and next error identification for integrated circuit devices. In the following description, details are set forth such as specific integrated circuit devices, error condition types, etc., in order to provide a thorough understanding of the present invention. It will be evident, however, that the present invention may be practiced without these details. In other instances, well-known computer components, etc., have not been described in particular detail so as not to obscure the present invention.

Figure 1:
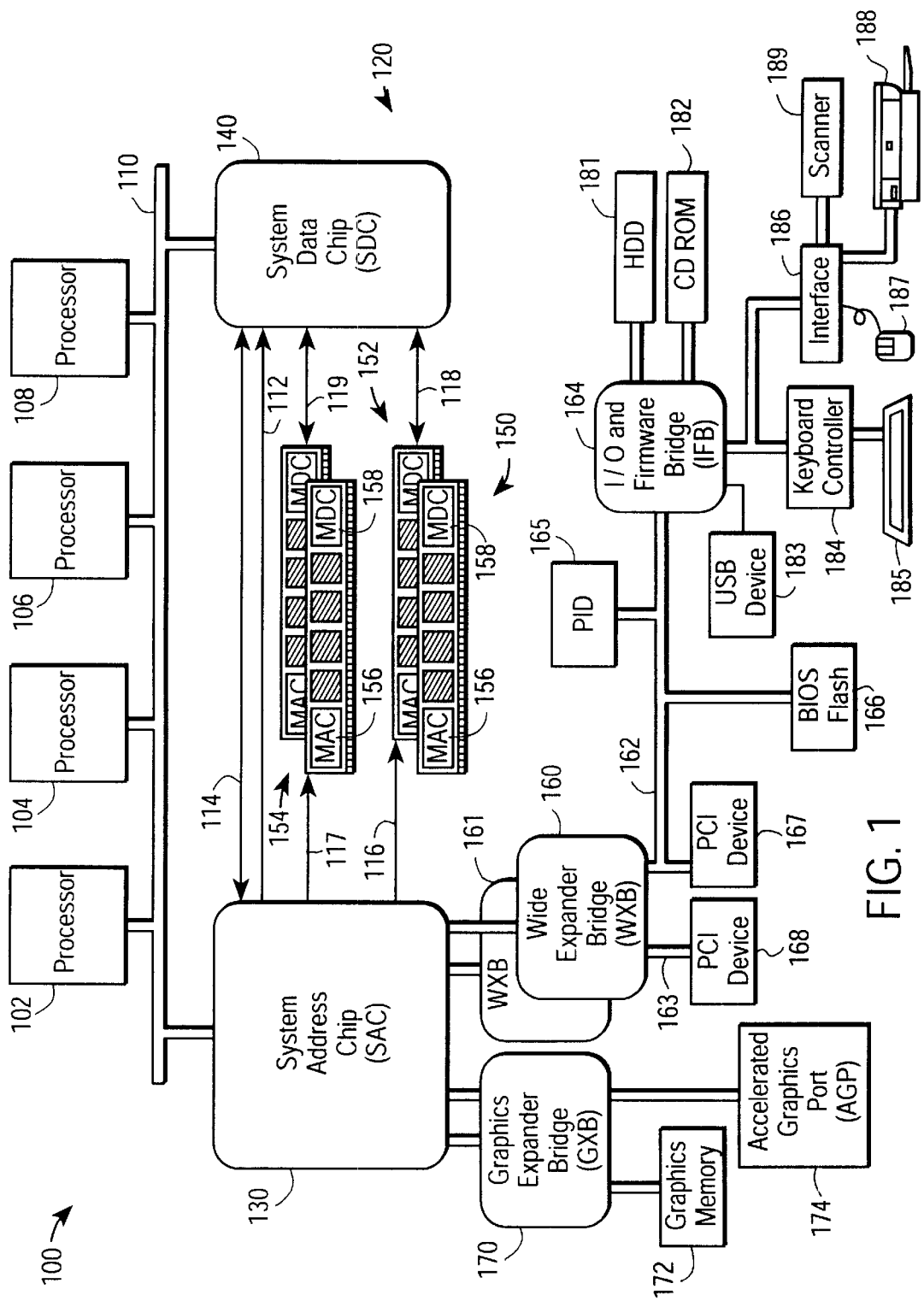
FIG. 1 illustrates an exemplary chipset-based system having first and next error identification.

FIG. 1 illustrates an exemplary chipset-based system 100 having first and next error identification. Although described in the context of system 100, the present invention may be implemented in any suitable system.

As illustrated in FIG. 1, system 100 comprises processors 102, 104, 106, and 108, a processor bus 110, and a memory and input/output (I/O) chipset 120. Processors 102, 104, 106, and 108 and chipset 120 are coupled to processor bus 110. System 100 for other embodiments may comprise one, two, three, or more than four processors, for example.

Chipset 120 comprises a system address chip (SAC) 130 coupled to an address portion of processor bus 110 and a system data chip (SDC) 140 coupled to a data portion of processor bus 110. SAC 130 and SDC 140 for one embodiment are coupled to one another by a private command bus 112 and a private data bus 114. A main memory 150 is coupled between SAC 130 and SDC 140. Chipset 120 also comprises, for I/O access, two wide expander bridges (WXBs) 160 and 161 coupled to SAC 130 and an optional graphics expander bridge (GXB) 170 coupled to SAC 130. Chipset 120 for other embodiments may comprise only one WXB, for example. SAC 130 and SDC 140 provide an interface to processor bus 110 and provide control and data routing for main memory 150 and I/O access through WXBs 160 and 161 and GXB 170.

Main memory 150 for one embodiment comprises two memory subsystems 152 and 154. Each memory subsystem 152, and 154 may comprise any suitable memory, such as synchronous dynamic random access memory (SDRAM) for example. Each memory subsystem 152 and 154 comprises one or more memory address chips (MACs) 156 and one or more memory data chips (MDCs) 158. Each memory subsystem 152 and 154 for one embodiment comprises a memory card having two MACs 156 and four MDCs 158. MACs 156 and MDCs 158 belong to chipset 120. MACs 156 for one embodiment provide SDRAM row address strobe and column address strobe (RAS/CAS) generation and redriving of addresses to SDRAM. MDCs 158 for one embodiment multiplex data from SDRAM to SDC 140. On reads, MDCs 158 latch data from SDRAM and transfer the data to SDC 140 a predetermined number of bits at a time. On writes, MDCs 158 latch data from SDC 140 and write the data to SDRAM. SAC 130 for one embodiment addresses each memory subsystem 152 and 154 over a memory address bus 116 and 117, respectively. SDC 140 for one embodiment receives data from and transfers data to each memory subsystem 152 and 154 over a memory data bus 118 and 119, respectively.

WXB 160 provides a control and data interface for two independent PCI buses 162 and 163. WXB 161 functions similarly as WXB 160. Each WXB 160 and 161 is coupled to SAC 130. GXB 170 provides a control and data interface for a graphics memory device 172 and an accelerated graphics port (AGP) 174.

Chipset 120 further comprises a compatibility I/O and firmware bridge chip (IFB) 164, a programmable interrupt device (PID) 165, and a basic input/output system (BIOS) flash controller 166 each coupled to PCI bus 162. PCI bus 162 serves as a compatibility bus and supports IFB 164 for interfacing with suitable compatibility components such as, for example, a hard disk drive (HDD) 181, a compact disc read only memory (CD ROM) device 182, a suitable universal serial bus (USB) device 183, a keyboard controller 184 for controlling a keyboard 185, and a suitable interface 186 for a mouse 187, a printer 188, and a scanner 189. PID 165 is a PCI device that gathers interrupts and delivers them from PCI bus 162 to processor bus 110 through PCI writes to a predetermined address. One or more other suitable PCI devices 167 and 168 may be coupled to PCI buses 162 and 163.

One or more integrated circuit devices of chipset 120 may each encounter various system, device, and data error conditions, for example, in performing their functions. For one embodiment, such devices may perform first and next error identification in accordance with a flow diagram 200 of FIG. 2. Such devices may comprise any suitable circuitry, whether hardwired or programmed with suitable software, for performing first and next error identification. Although described in the context of an integrated circuit device of chipset 120, first and next error identification may be performed for any suitable integrated circuit.

Figure 2:
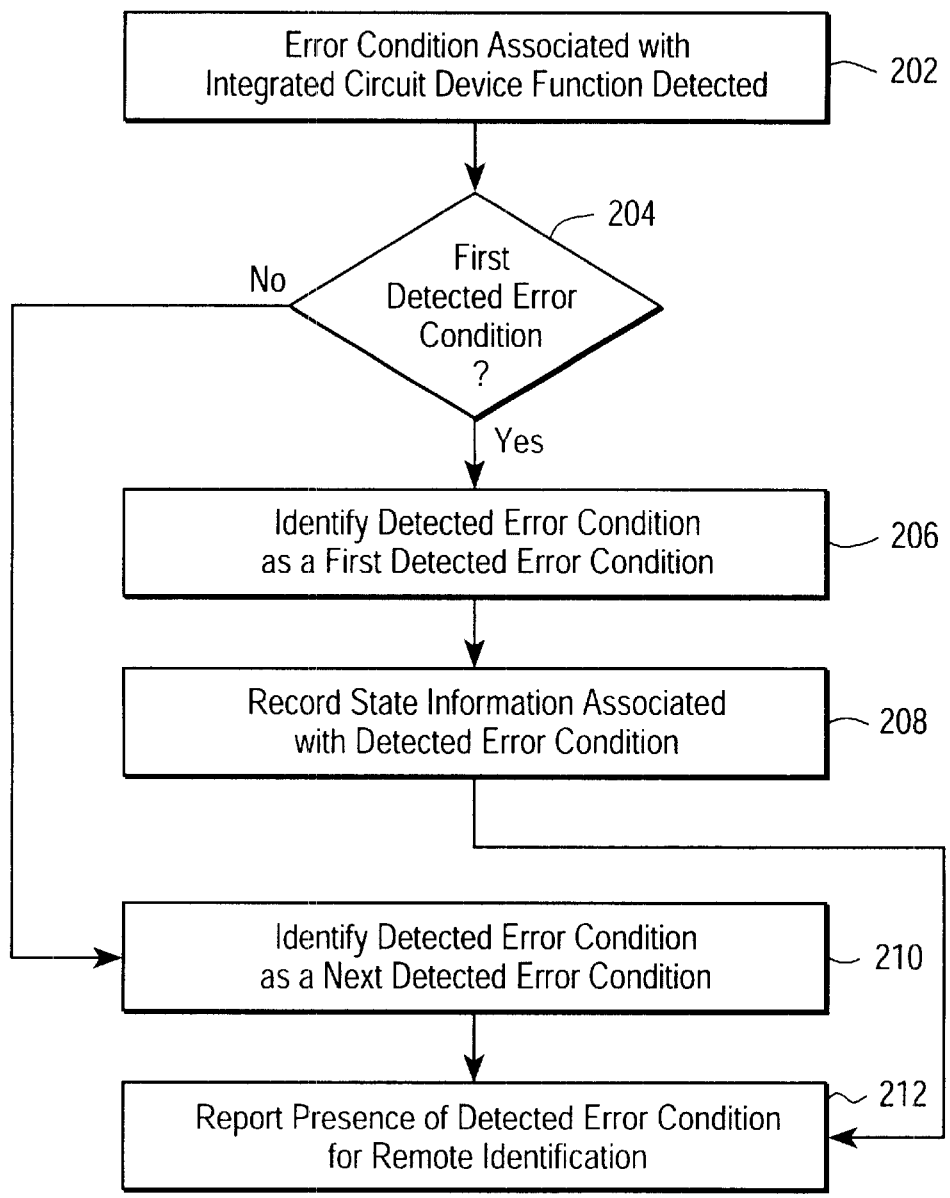
FIG. 2 illustrates, for one embodiment, a flow diagram for first and next error identification.

For step 202 of FIG. 2, an error condition associated with the functioning of an integrated circuit device is detected. Any suitable error detection circuitry may be used to detect an error condition, and any suitable error condition may be detected. An error condition may also be detected remotely and reported to a local integrated circuit device for recordation. Whether the detected error condition is a first detected error condition is determined for step 204. First detected error condition means the first detected error condition since some prior event, such as a device or system reset or a clearing of prior identified error conditions for example. If the detected error condition is the first detected error condition, the detected error condition is identified as a first detected error condition for step 206. For one embodiment, state information associated with the identified first detected error condition may also be recorded for step 208. If the detected error condition is not the first detected error condition, the detected error condition is identified as a next detected error condition for step 210.

For one embodiment, first and next error identification may be performed using suitable error recordation circuitry comprising a first error status register and a next error status register. The first error status register comprises a predetermined number of bits, each representing a respective error condition. The next error status register comprises a predetermined number of bits, each representing a respective error condition. For one embodiment, the next error status register comprises a bit corresponding to each bit of the first error status register. A detected error condition is recorded in an error status register by asserting the bit representing the detected error condition. Asserting the bit means altering the state of the bit either from one to zero or from zero to one to signal the detection of the represented error condition. Although described as being recorded by asserting a predetermined bit within a register, each first and next error condition may be recorded in any suitable manner in any suitable memory location.

Whether the detected error condition is a first detected error condition is determined for step 204 by determining whether any error conditions have been recorded in the first error status register. If not, the detected error condition is identified as the first detected error condition for step 206 by recording the detected error condition in the first error status register. Otherwise, the detected error condition is identified as a next detected error condition for step 210 by recording the detected error condition in the next error status register. As flow diagram 200 of FIG. 2 may be repeated for each detected error condition, the next error status register for one embodiment may record more than one next error condition detected subsequent to the first detected error condition.

If two detected error conditions occur first in the same cycle, then for one embodiment both error conditions may be recorded in the first error status register. Each error condition may then optionally be prioritized with respect to the other in servicing the error conditions. Alternatively, one error condition may be prioritized over the other for recordation in the first error status register. The other error condition may then be recorded in the next error status register.

The error recordation circuitry may also comprise one or more log registers or other suitable memory device(s) for recording, for step 208, state information associated with the first detected error condition. Address, data, and/or command information, for example, associated with the first detected error condition may be captured in one or more log registers for error handling, diagnostics, or debugging, for example. For other embodiments, information associated with a next detected error condition may also be captured in one or more log registers or other suitable memory device(s) for error handling, diagnostics, or debugging, for example.

Error conditions may be categorized as recoverable and continuable, non-recoverable but continuable, and non-recoverable and non-continuable. Error conditions may also be categorized as non-fatal and fatal. Non-fatal error conditions may trigger an interrupt or machine check for servicing the error condition. Fatal error conditions trigger a system or device reset. Some error conditions may be considered either non-fatal or fatal, depending on the error handling technique used.

Identifying a first detected error condition may be used to help perform error handling to contain the error condition, recover from the error condition, continue despite the error condition, and/or perform a system or device reset to avoid further error conditions.

As one example, an integrated circuit device may encounter a recoverable and continuable error condition, such as data with a single-bit error correcting code (ECC) error for example, followed by a next error condition while servicing the recoverable error condition. The recoverable error condition may be recorded in the first error status register to trigger an interrupt for servicing the error condition by correcting the data. The occurrence of a fatal error condition, for example, just subsequent to the first single-bit ECC error condition would be recorded in the next error status register to trigger a system or device reset. First and next error identification, then, allows the servicing of a first error condition with continued monitoring for a subsequent error condition while the first error condition is being serviced. If the device had only one error status register, detection of the recoverable error condition may have masked detection of the fatal error condition, possibly resulting in data corruption.

As another example, first and next error identification may be used for non-recoverable but continuable error conditions. If an integrated circuit device of a server system, for example, encounters a non-recoverable error condition, such as a parity error condition for example, first and next error identification records the non-recoverable error condition in the first error status register and records address, data, and/or command information associated with the nonrecoverable error. Error handling may then be performed to identify, based on the associated state information, the user session or application for which the error condition occurred and to reset or restart only that user session or application. In this manner, only the user session or application for which the error condition occurred undergoes the reset while other user sessions and applications continue. Next error conditions may continue to be monitored while the first error condition is being serviced.

Identifying a first detected error condition also helps for device and/or system diagnostics and debugging. As one example, a first error condition may trigger subsequent error conditions. An address parity error, for example, may trigger a subsequent data transfer protocol violation. By identifying that the protocol violation likely followed from the parity error, the source of the error condition may likely be more readily identified.

The presence of the error condition detected for step 202, for one embodiment, may be reported for remote identification for step 212 of FIG. 2. For one embodiment, the detected error condition may be recorded in one or more other error status registers or other suitable memory devices for identification. The presence of a detected error condition may be reported to another error status register or memory device in any suitable manner. The other error status register or memory device may be located in any suitable location for identification.

As one example, an integrated circuit device or chip may comprise a chip-level error status register in which the presence of a detected error condition recorded in a first or next error status register elsewhere in the chip is recorded. The presence of the detected error condition may be recorded in the chip-level error status register in any suitable manner.

The presence of the detected error condition may be recorded in the chip-level error status register by asserting a bit representative of the location on the chip where the error condition was detected. The first or next error status register at that location may then be read for error handling. In this manner, a detected error condition on the chip may be serviced more readily as only one error status register on the chip is read to identify a detected error condition.

The presence of the detected error condition may also be recorded in the chip-level error status register by asserting a bit representative of the location on the chip where the error condition was detected as well as the category of the detected error condition. In this manner, servicing of the detected error condition may be prioritized without having to read the first or next error status register at the location where the error condition occurred. Servicing fatal error conditions, for example, may be prioritized over non-fatal error conditions or other interrupt servicing.

The presence of the detected error condition may also be recorded in the chip-level error status register by asserting a bit representative of the location on the chip where the error condition was detected as well as the detected error condition itself.

As another example, an integrated circuit device or chip may comprise a system-level error status register in which the presence of a detected error condition recorded in a first or next error status register elsewhere within a system or subsystem is recorded. The error condition may be detected, for example, locally on the same device or chip or on another chip within the same system or subsystem. The presence of the detected error condition may be recorded in the system-level error status register in any suitable manner. The presence of the detected error condition may be recorded in the system-level error status register, for example, similarly as for the chip-level error status register only on a system level.

Error status registers for remote identification of detected error conditions may record the presence of any suitable detected error conditions, such as locally detected error conditions, error conditions detected on a chip-level, and/or error conditions detected on a system level. An integrated circuit device or chip may also comprise a first error status register for remote identification as well as a next error status register for remote identification. In this manner, first and next error identification may be performed on a chip-level or system-level, for example, to identify the first detected error condition on the chip or in the system, respectively.

Figure 3:
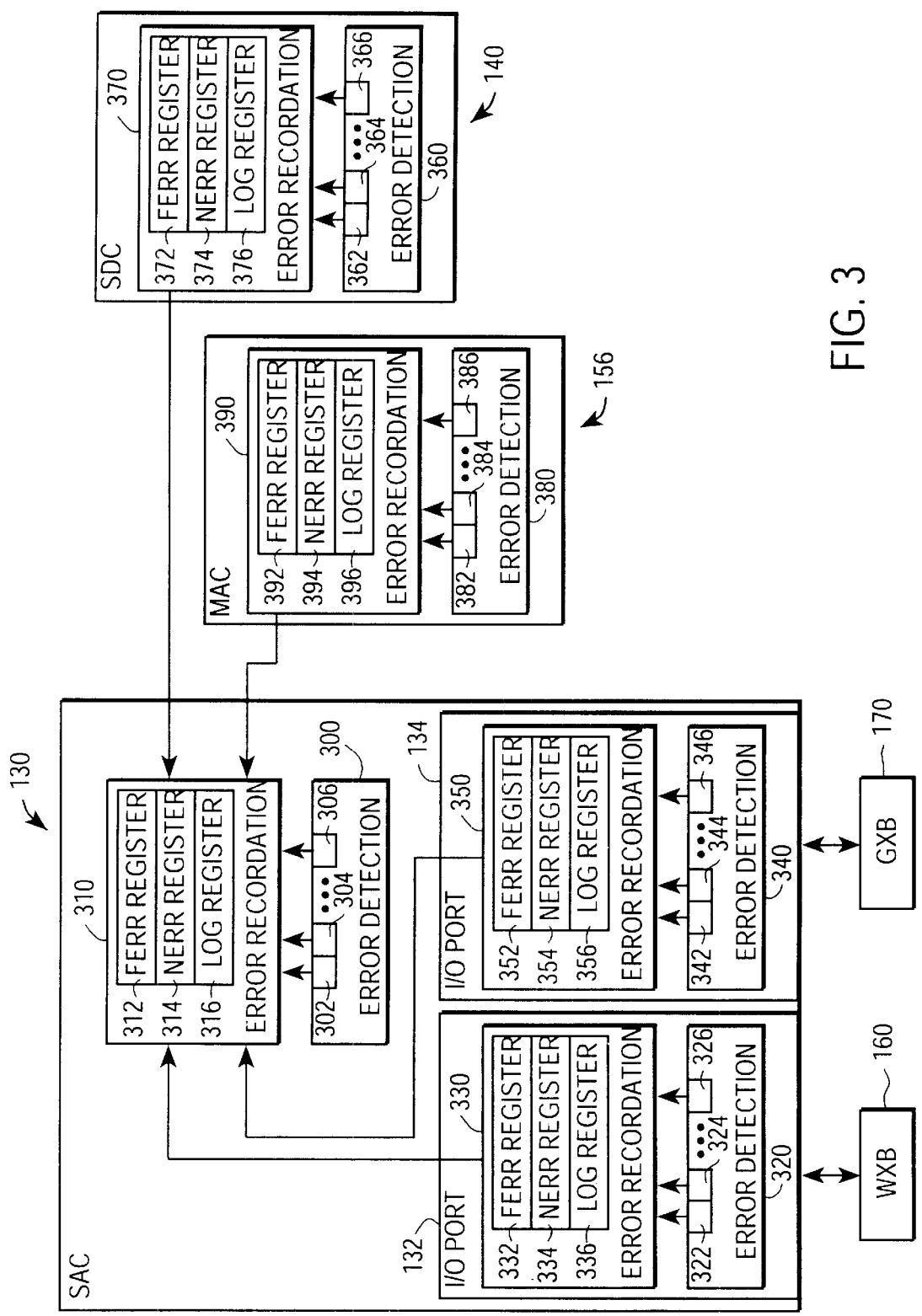
FIG. 3 illustrates, for one embodiment, exemplary error status registers for integrated circuit devices of FIG. 1.

FIG. 3 illustrates exemplary error status registers for integrated circuit devices and chips of FIG. 1.

As illustrated in FIG. 3, SAC 130 comprises error detection circuitry 300 comprising detection logic 302, 304, and 306 each for detecting a respective error condition and error recordation circuitry 310 comprising a first error status register or FERR register 312, a next error status register or NERR register 314, and a log register 316. Exemplary local error conditions detected by error detection circuitry 300 and recorded by error recordation circuitry 310 include parity errors on processor bus 110 and private data bus 114 and command underflows with SDC 140 and MACs 156. Exemplary state information recorded in log register 316 by error recordation circuitry 310 include address, command, and parity information on processor bus 110.

SAC 130 also comprises error detection circuitry 320 and error recordation circuitry 330 for an I/O port 132 coupled to WXB 160 and error detection circuitry 340 and error recordation circuitry 350 for an I/O port 134 coupled to GXB 170. I/O ports 132 and 134 may each implement any suitable communication protocol. For one embodiment, I/O ports 132 and 134 are both F16 ports.

Error detection circuitry 320 comprises detection logic 322, 324, and 326 each for detecting a respective error condition. Error recordation circuitry 330 comprises a first error status register 332, a next error status register 334, and a log register 336. Error detection circuitry 340 comprises detection logic 342, 344, and 346 each for detecting a respective error condition. Error recordation circuitry 350 comprises a first error status register 352, a next error status register 354, and a log register 356. Exemplary local error conditions detected by error detection circuitry 320 and 340 and recorded by error recordation circuitry 330 and 350 include outbound data buffer parity errors and inbound header and data parity errors. Exemplary state information recorded in log register 336 and 356 by error recordation circuitry 330 and 350, respectively, include parity, byte enable, and data information on the I/O bus coupled to WXB 160 and GXB 170, respectively. Error recordation circuitry 330 and 350 each report the presence of a detected error condition to error recordation circuitry 310 which records the presence of the detected error condition in either first error status register 312 or next error status register 314, as appropriate, by asserting a bit corresponding to the I/O port in which the detected error condition occurred.

SDC 140 comprises error detection circuitry 360 comprising detection logic 362, 364, and 366 each for detecting a respective error condition and error recordation circuitry 370 comprising a first error status register 372, a next error status register 374, and a log register 376. Exemplary local error conditions detected by error detection circuitry 360 and recorded by error recordation circuitry 370 include parity and receive length errors on private data bus 114, single-bit and double-bit ECC data errors on processor bus 110 or data transfer buses 118 or 119, and data transfer command overlaps and underflows with main memory 150. Exemplary state information recorded in log register 376 by error recordation circuitry 370 include parity and command information on private command bus 112 and parity and data information on private data bus 114. SDC 140 may comprise a separate log register, one for private command bus information and one for private data bus information, for example. Error recordation circuitry 370 may report the presence of a detected error condition to error recordation circuitry 310 which records the presence of the detected error condition in either first error status register 312 or next error status register 314, as appropriate, by asserting a bit corresponding to SDC 140 and the category of the detected error condition. The reported error condition category may be a correctable memory error, such as a single-bit ECC error on data from main memory 150 for example, a non-fatal error that is not correctable, such as a double-bit ECC error or a parity error for example, or a fatal error.

MAC 156 comprises error detection circuitry 380 comprising detection logic 382, 384, and 386 each for detecting a respective error condition and error recordation circuitry 390 comprising a first error status register 392, a next error status register 394, and a log register 396. Exemplary local error conditions detected by error detection circuitry 380 and recorded by error recordation circuitry 390 include parity errors on memory address bus 116 or 117. Exemplary state information recorded in log register 396 by error recordation circuitry 390 include command information on memory address bus 116 or 117. Error recordation circuitry 390 may report the presence of a detected error condition to error recordation circuitry 310 which records the presence of the detected error condition in either first error status register 312 or next error status register 314, as appropriate, by asserting a bit corresponding to memory subsystem 152 or 154 and the category of the detected error condition. For embodiment, only a fatal detected error condition is reported.

WXBs 160 and 161 and GXB 170 may each also comprise suitable error detection circuitry for performing first and next error identification.

For one embodiment where state information for only first error conditions is logged, error recordation circuitry 310 records in first error status register 312 any error condition detected subsequent to a first correctable single-bit ECC error condition reported from MAC 156. Recordation of this first-error condition in first error status register 312 does not block other error conditions from being set in first error status register 312. In this manner, single bit errors may be polled periodically while allowing state information for other errors to be logged.

Although described in the context of identifying a first and a next detected error condition, the present invention may be extended to identify a first, second, and next detected error condition; a first, second, third, and next detected error condition; etc.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A method comprising:
  detecting an error condition associated with an integrated circuit device function;
  determining whether the detected error condition is a first detected error condition; and
  recording the detected error condition in a first register if the detected error condition is the first detected error condition, otherwise recording the detected error condition in a second register as a next detected error condition if the detected error condition is not the first detected error condition.

2. The method of claim 1, wherein the recording includes asserting a bit in the first or second register corresponding to the detected error condition.

3. The method of claim 2, further comprising recording subsequent detected error conditions after the first detected error condition by asserting a bit in the second register.

4. The method of claim 1, further comprising recording state information associated with the first detected error condition is in a third register.

5. The method of claim 1, wherein the detected error condition is of for a remote location.

6. An integrated circuit device comprising:
  a first error status register to record a first detected error condition associated with an integrated circuit device function, the first detected error condition asserting a corresponding bit in the first error status register; and
  a next error status register to record an error condition detected subsequent to the first detected error condition, the subsequent detected error condition asserting a corresponding bit in the next error status register.

7. The integrated circuit device of claim 6, wherein the first and subsequent error conditions are localized as error conditions for the integrated circuit device.

8. The integrated circuit device of claim 6, further comprising a log register to record state information associated with the first detected error condition.

9. An integrated circuit device comprising:
  means for recording a detected error condition occurring first and associated with an integrated circuit device function as a first detected error condition by asserting a corresponding bit; and
  means for recording an error condition detected subsequent to the first detected error condition as a next detected error condition by asserting a different corresponding bit.

10. The integrated circuit device of claim 9, further comprising means for detecting an error condition associated with the integrated circuit device finction and determining if a corresponding bit to indicate if the error condition is a first detected error condition is already asserted.

11. The integrated circuit device of claim 9, further comprising means for recording state information associated with the first detected error condition.

12. A system comprising:
  a plurality of integrated circuit devices coupled to operate together, at least one integrated circuit device having:
    a first register to store an indication of a detected error condition if the detected error condition is a first detected error condition occurring in a different integrated circuit, and
    a second register to store an indication of subsequent occurring error conditions in the different integrated current, if the detected error condition occurs subsequent to the first detected error condition.

13. The system of claim 12, wherein the at least one integrated circuit device comprises circuitry to detect an error condition occurring within the same integrated circuit device.

14. The system of claim 12, wherein the at least one integrated circuit device further comprises a third memory to record state information associated with the first detected error condition.

15. The system of claim 12, wherein the at least one integrated circuit device includes a system address chip, a system data chip, a memory address chip, an input/output expander bridge and a graphics expander bridge.

16. The system of claim 15 further including a processor coupled to the system address chip and the system data chip.

* * * * *

UNITED STATES PATENT AND TRADEMARK OFFICE
CERTIFICATE OF CORRECTION

PATENT NO. : 6,615,374 B1
DATED : September 2, 2003
INVENTOR(S) : Moran

It is certified that error appears in the above-identified patent and that said Letters Patent is hereby corrected as shown below:

<u>Column 8,</u>
Line 6, after "condition", delete "is".
Line 8, after "condition is", delete "of".

Signed and Sealed this

Fourth Day of May, 2004

JON W. DUDAS
*Acting Director of the United States Patent and Trademark Office*